(12) United States Patent
Smith, III

(10) Patent No.: US 6,962,347 B2
(45) Date of Patent: Nov. 8, 2005

(54) METAL BACKUP SEAL FOR UNDERSEA HYDRAULIC COUPLING

(75) Inventor: Robert E. Smith, III, Missouri City, TX (US)

(73) Assignee: National Coupling Company, Inc., Stafford, TX (US)

( * ) Notice: Subject to any disclaimer, the term of this patent is extended or adjusted under 35 U.S.C. 154(b) by 186 days.

(21) Appl. No.: 10/285,084

(22) Filed: Oct. 31, 2002

(65) Prior Publication Data

US 2004/0084848 A1 May 6, 2004

(51) Int. Cl.[7] ............................................. F16L 17/00
(52) U.S. Cl. .................. 277/602; 277/603; 277/637; 137/614.04; 285/108
(58) Field of Search ........................... 277/602, 603, 277/607, 616, 628, 637; 137/614.04, 614; 285/108, 111, 117

(56) References Cited

U.S. PATENT DOCUMENTS

| | | | |
|---|---|---|---|
| 2,753,195 A | 7/1956 | Palmer | 284/184 |
| 4,694,859 A | 9/1987 | Smith, III | 137/614.04 |
| 4,709,726 A | 12/1987 | Fitzgibbons | 137/614.04 |
| 4,768,538 A | 9/1988 | Mintz et al. | 137/15 |
| 4,832,080 A | 5/1989 | Smith, III | 137/614.04 |
| 4,834,139 A | 5/1989 | Fitzgibbons | 137/614.04 |
| 4,900,071 A | 2/1990 | Smith, III | 285/379 |
| 5,052,439 A | 10/1991 | Smith, III | 137/614.04 |
| 5,099,882 A | 3/1992 | Smith, III | 137/614.04 |
| 5,103,868 A | 4/1992 | Wilkins | 137/614.03 |
| 5,203,374 A | 4/1993 | Smith, III | 137/614.04 |
| 5,232,021 A | 8/1993 | Smith, III | 137/614.04 |
| 5,337,782 A | 8/1994 | Wilcox | 137/614.03 |
| 5,339,861 A | 8/1994 | Smith, III | 137/614.04 |
| 5,343,891 A | 9/1994 | Bosley | 137/614.04 |
| 5,368,070 A | 11/1994 | Bosley | 137/614.04 |
| 5,494,073 A | 2/1996 | Saito | 137/614.03 |
| 5,556,139 A | 9/1996 | Wilkins | 285/111 |
| 5,762,106 A | 6/1998 | Smith, III | 137/614.04 |
| 5,771,927 A | 6/1998 | Johansen et al. | 137/614.04 |
| 5,810,047 A | 9/1998 | Kirkman | 137/614.01 |
| 5,979,499 A | 11/1999 | Smith, III | 137/614.04 |
| 5,983,934 A | 11/1999 | Smith, III | 137/614.04 |
| 6,085,785 A * | 7/2000 | Smith, III | 137/614.04 |
| 6,202,690 B1 * | 3/2001 | Smith, III | 137/614.04 |
| 6,202,691 B1 | 3/2001 | Smith, III | 137/614.04 |

* cited by examiner

*Primary Examiner*—Enoch Peavey
(74) *Attorney, Agent, or Firm*—Wong, Cabello, Lutsch, Rutherford & Brucculeri, LLP

(57) ABSTRACT

A backup metal O-ring seal is retained around the outer diameter of a seal retainer of an undersea hydraulic coupling member to seal a leak path around the seal retainer. The metal O-ring seal may be seated on a shoulder on the seal retainer. The backup metal seal is effective for high temperature and high pressure applications.

20 Claims, 2 Drawing Sheets

METAL BACKUP SEAL FOR UNDERSEA HYDRAULIC COUPLING

BACKGROUND

1. Field of the Invention

This invention relates, in general, to hydraulic couplings, and specifically to hydraulic couplings used in undersea drilling and production applications. More particularly, the invention involves seals between male and the female coupling members in undersea hydraulic couplings.

2. Description of Related Art

Subsea hydraulic couplings are old in the art. The couplings generally consist of a male member and a female member with seals to seal the junction between the male and female members. The female member generally has a cylindrical body with a relatively large diameter bore at one end and a relatively small diameter bore at the other. The small bore facilitates connections to hydraulic lines, while the large bore contains the seals and receives the male portion of the coupling. The male member includes a probe section insertable into the large bore of the female member. According to various embodiments of the device, the seals either abut the end, or face, of the male member or engage the male member about its outer circumference. Hydraulic fluid is then free to flow through the female and male portions of the coupling and seals prevent that flow from escaping about the joints of the coupling.

Optionally, a check valve may be installed in the female member and also in the male member. Each check valve is open when the coupling is made up; however, each check valve closes when the coupling is broken so as to prevent fluid from leaking out of the system of which the coupling is part.

In U.S. Pat. Nos. 4,694,859 and 5,762,106 to Robert E. Smith III, an undersea hydraulic coupling and metal seal is disclosed. A reusable metal seal engages the circumference of the probe when it is positioned within the female member body. The seal is held in place by a cylindrical seal retainer. When the male and female portions of the coupling are parted under pressure, the seal retainer prevents the metal seal from blowing out through the bore of the female member.

In U.S. Pat. No. 5,339,861, a hydraulic coupling with a hollow metal O-ring seal is disclosed. The hollow metal O-ring is held captive between an internal shoulder and a retainer inserted into the internal bore of the female member. The metal O-ring also may be pressure-energized to expand the seal cavity in response to fluid pressure in the coupling.

To retain the metal seal in the female member of an undersea hydraulic coupling, a seal retainer may be connected to the female member. The seal retainer may be a generally sleeve-shaped cylindrical body that is inserted into the bore of the female member until the seal retainer abuts a shoulder in the bore of female member. To secure the seal retainer against the shoulder, a retainer locking member may also be attached to the female member using threads or snap rings, for example.

Although metal seals that are used in undersea hydraulic couplings are generally reliable, a leak path may exist between the seal retainer and the female coupling member. In the past, elastomeric O-rings have been used to provide a seal between the outer circumference of the seal retainer and the inner circumference of the bore of the female coupling member. However, the elastomeric O-rings may not be reliable enough to block this leak path at the extreme temperatures and pressures that may be encountered at subsea depths. A more reliable seal is needed between the seal retainer and female coupling member to withstand the temperatures and pressures in the subsea environment. An undersea hydraulic coupling is needed having a more reliable seal around the outer circumference of the seal retainer that may be removed and replaced.

SUMMARY OF THE INVENTION

A metal back-up seal for an undersea hydraulic coupling seals a leak path between the female coupling member and the seal retainer. The metal back-up seal is held by the seal retainer in the receiving chamber of the female coupling member. The metal back-up seal may be a metal O-ring seal that fits around the outer diameter of the seal retainer and may be pressure energized by hydraulic fluid acting on a cavity of the seal. The seal may be press fitted around the seal retainer so that the seal may be removed from the receiving chamber together with the seal retainer.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

DETAILED DESCRIPTION

Figure 1:
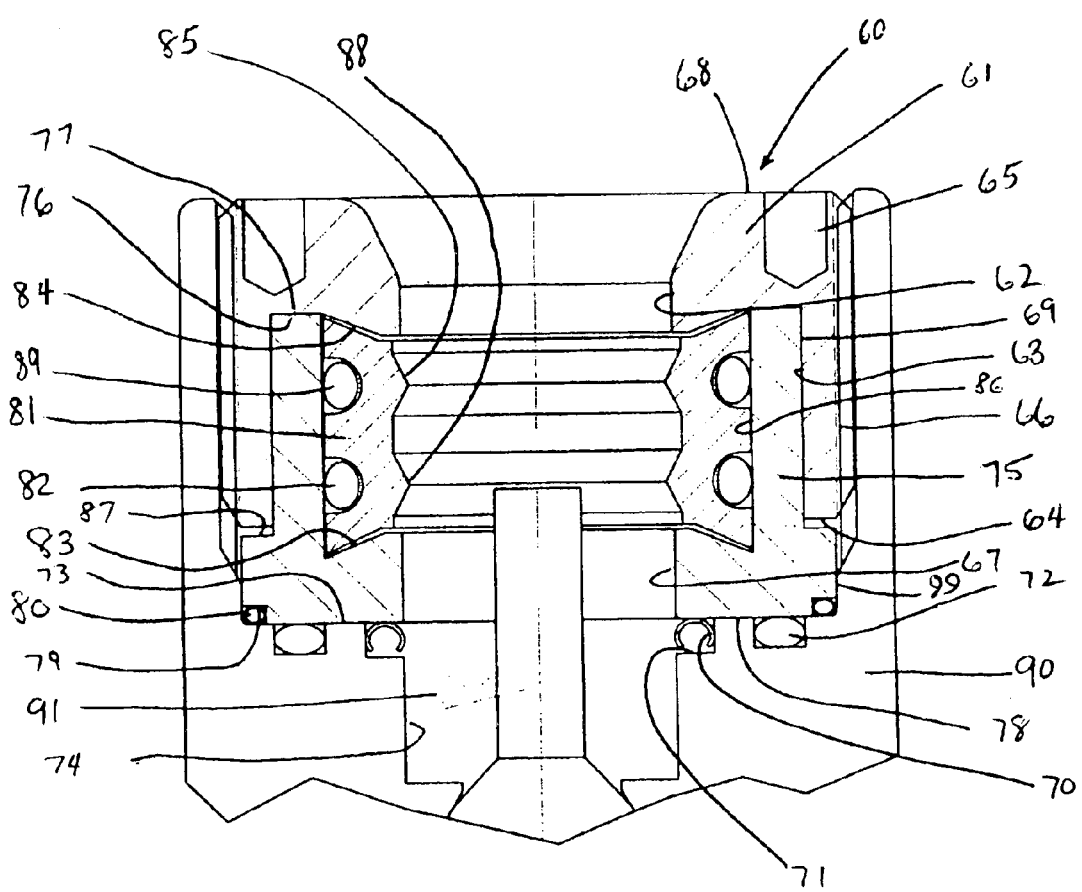
FIG. 1 is a section view of a metal back-up seal retained in a female coupling member of an undersea hydraulic coupling according to a first embodiment.

As shown in FIG. 1, in a first embodiment, seal retainer 60 retains primary metal seal 70 and back-up metal seal 80 in the receiving chamber 91 of female coupling member 90. In this embodiment, the primary metal seal is a hollow pressure energized metal seal with a C-shaped cross section that is retained on internal shoulder 71 of the receiving chamber. The primary metal seal may be axially compressed slightly by the seal retainer to pre-load the seal, and may be pressure energized by hydraulic fluid in the seal cavity to urge the inner diameter radially inwardly further than the internal diameter of receiving chamber wall 74 to seal with the male coupling member, and the outer diameter radially outwardly to seal against the female coupling member.

In one embodiment of the invention, the back-up metal seal is a hollow metal O-ring that is seated on shoulder 79 of the seal retainer. The back-up metal seal may be press fitted against the seal retainer so that it may be removed from the receiving chamber together with the seal retainer. The back-up metal seal may be slightly compressed when the seal retainer is fully inserted into the receiving chamber to approach or abut shoulder 73. The compression urges the inner diameter radially inwardly against the seal retainer and the outer diameter radially outwardly against the receiving chamber of the female coupling member. In one embodiment, the back-up metal seal may have one or more holes therein to allow hydraulic fluid to enter the seal and pressure energize the seal.

In one embodiment of the invention, the seal retainer may include shell 61 and seal carrier 75. The shell may be a generally ring-shaped body with an outer diameter 66 that may be threaded to engage with the female coupling member. The shell has first end 68, second end 64, first larger inner diameter 63, second smaller inner diameter 62, and internal shoulder 76 between the first and second inner diameters. The shell also may include negative or reverse angle shoulder 84 that extends radially inwardly from internal shoulder 76. Holes 65 may be included in the first end of the shell, and a spanner or other tool may be inserted into the holes to rotate the shell to engage or disengage it from the female member.

In the first embodiment, the seal carrier is a generally ring shaped sleeve, part of which engages or fits at least partially into the shell. The seal carrier has first end 77 which fits into the shell, second end 78, first larger outer diameter 99, second smaller outer diameter 69, first larger inner diameter 86, and second smaller inner diameter 67. In one embodiment, the seal carrier may have negative or reverse angle shoulder 83 between the first larger inner diameter and second smaller inner diameter. The seal carrier also may include outer shoulder 87 between the first larger outer diameter and the second smaller outer diameter.

In one embodiment, the first end of the seal carrier slides into the first larger inner diameter of 63 of the shell. There may be little or no clearance between the second smaller outer diameter of the seal carrier and the inner diameter of the shell, or there may be a slight interference fit. When the first end of the seal carrier is fully inserted into the shell, the first end 77 may abut internal step 76 of the shell, and second end 64 of the shell may abut outer shoulder 31 of the seal carrier.

In the embodiment of FIG. 1, seal 72 is an elastomeric O-ring in a groove in shoulder 73 of the receiving chamber. Additionally, the seal retainer holds elastomeric seal 81 between reverse angled shoulders 83 and 84 that restrain the seal from implosion into the central bore. Seal 81 may have a dovetail cross section, and has a dovetail interfit between the reverse angled shoulders. The inner diameter of seal 81 may have one or more projections 85, 88 that extend farther into the central bore than the smaller inner diameters of the shell or seal carrier, to seal radially with the male member when the male member is in the receiving chamber. O-rings 82, 89 may be positioned around the outer diameter of seal 81.

Figure 2:
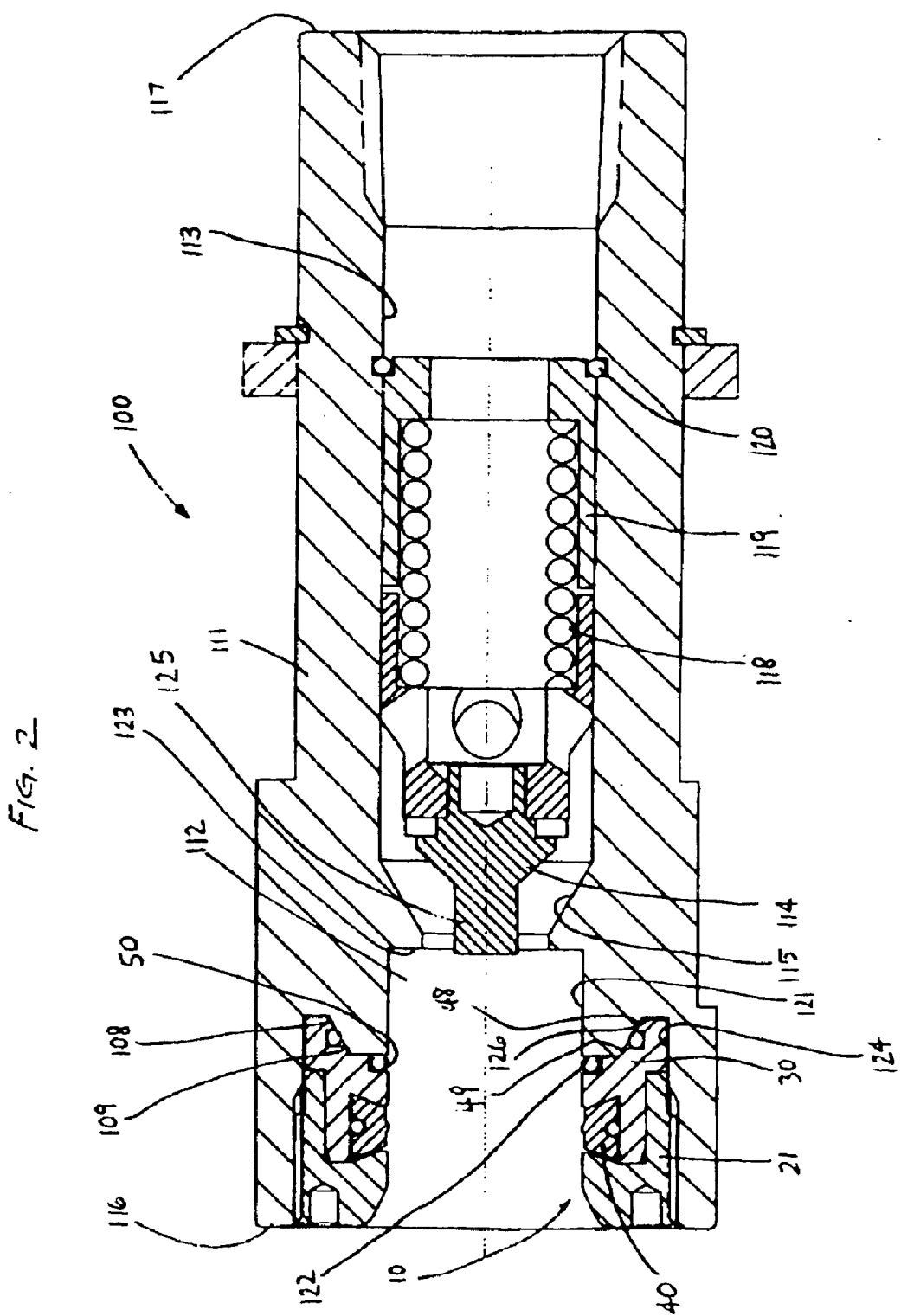
FIG. 2 is a section view of a metal back-up seal in a female coupling member of an undersea hydraulic coupling according to a second embodiment.

In another embodiment, as shown in FIG. 2, the back-up metal seal may be integral with the seal carrier. For example, metal sealing surfaces 48, 49 on the seal carrier may be angled or beveled to form metal to metal seals with surfaces 108 and 109 of female coupling member 100 when the seal retainer is fully engaged to the female coupling member.

As shown in FIG. 2, seal retainer 10 holds primary metal seal 50 on or adjacent shoulder 122 in the female coupling member. The seal retainer may include shell 21 and seal carrier 30, with elastomeric seal 40 between the shell and seal carrier. The shell may be threaded or otherwise removably attached to the wall 124 of the receiving chamber 112 of the female coupling member, and the seal carrier may abut internal shoulder 126 in the receiving chamber.

In the embodiment of FIG. 2, the female coupling member has body section 111 with first end 116 and second end 117. Poppet valve 114 slides within bore 113 to control fluid flow through the female coupling member. The poppet valve may be biased by spring 118 to a closed position against valve seat 115. The valve spring may be held between the poppet valve and spring collar 119, which is held in the bore by snap ring or collar clip 120. Valve actuator 125 may extend from the face of the valve. When a male coupling member probe is inserted into receiving chamber 112, the probe may have a sliding interfit with the second section 121 of the receiving chamber until the male member approaches or abuts shoulder 123. The valve actuator of the male member may engage the valve actuator of the female member to open the poppet valves for fluid flow between the coupling members.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A seal assembly for an undersea hydraulic coupling member, comprising:
   a seal retainer engaged with the coupling member, the seal retainer having an outer shell and a seal carrier, at least part of the seal carrier fitting inside the outer shell, the seal carrier having an inner diameter and an outer diameter;
   a primary metal seal positioned at the inner diameter of the seal carrier; and
   a back-up metal seal positioned at the outer diameter of the seal carrier.

2. The seal assembly of claim 1 wherein the back up metal seal is a hollow O-ring.

3. The seal assembly of claim 1, wherein the back-up metal seal is integral with the seal carrier.

4. The seal assembly of claim 1 wherein the outer shell has a threaded outer diameter engageable with the undersea hydraulic coupling member.

5. The seal assembly of claim 1 wherein the outer shell has a first larger inner diameter, a second smaller inner diameter, and an insertable shoulder between the first and second inner diameters.

6. The seal assembly at claim 1 wherein the seal carrier has a first larger outer diameter and a second smaller inner diameter insertable into the outer shell.

7. The seal assembly of claim 1 wherein the seal carrier has a first larger inner diameter, a second smaller inner diameter, and an internal shoulder between the first and second inner diameters.

8. The seal assembly of claim 1 further comprising an annular elastomeric seal between the outer shell and the seal carrier.

9. The seal assembly of claim 7 wherein the annular elastomeric seal has a dovetail cross section.

10. A sealing apparatus for an undersea hydraulic coupling, comprising:
    an externally threaded two piece body comprising an outer ring-shaped body and an inner ring-shaped sleeve that fits at least partially inside the outer ring-shaped body, the two piece body having an inner circumference and an outer circumference;
    a primary metal seal having a hollow body, the primary metal seal being retained at the inner circumference of the two piece body;
    a backup metal seal having a hollow body, the backup metal seal being retained at the outer circumference of the sealing apparatus; and
    an elastomeric seal having a dovetail interfit with the threaded two piece body.

11. The sealing apparatus of claim 10 wherein the backup metal seal is a hollow metal O-ring.

12. The sealing apparatus of claim 10 wherein the primary metal seal is a hollow metal C-ring.

13. The sealing apparatus of claim 10 further comprising a shoulder on the outer diameter of the threaded two piece body, the backup metal seal being retained on the shoulder.

14. The sealing apparatus of claim 10 wherein the threaded two piece body comprises a first reverse angled shoulder and a second reverse angled shoulder, the shoulders restraining the elastomeric seal.

15. A sealing device for an undersea hydraulic coupling member comprising:
   a body having an outer shell and a sleeve shaped seal carrier, the seal carrier having a first end inserted into the outer shell, a second end having a larger outer diameter than the first end, and at least one internal shoulder surface;
   a first annular seal held by the inner seal carrier on the at least one internal shoulder surface; and
   a second metal O-ring seal around the outer diameter of the second end of the seal carrier.

16. The sealing device of claim 15 wherein the first annular seal is a pressure energized metal seal.

17. The sealing device of claim 15 wherein the first annular seal is an elastomeric O-ring with a dovetail cross section.

18. The sealing device of claim 15 wherein the outer shell has an internal shoulder, the first annular seal having an interfit between the internal shoulder of the outer shell and the internal shoulder of the seal carrier.

19. The sealing device of claim 15 wherein the outer shell is threaded.

20. The sealing device of claim 15 wherein the outer diameter of the seal carrier has a shoulder at the second end thereof, the second metal O-ring seal being seated on the shoulder.

* * * * *